United States Patent [19]

Langer et al.

[11] Patent Number: 5,039,782

[45] Date of Patent: Aug. 13, 1991

[54] POLYMERIC WHITENING AGENT

[75] Inventors: Matthew E. Langer, New City, N.Y.; Ferial Khorshahi, Leonia, N.J.; Michael P. Aronson, West Nyack, N.Y.

[73] Assignee: Lever Brothers Company, division of Conopco, Inc., New York, N.Y.

[21] Appl. No.: 626,075

[22] Filed: Dec. 11, 1990

[51] Int. Cl.$^5$ .............................................. C08G 63/52
[52] U.S. Cl. ....................................... 528/272; 528/274; 528/275; 528/288; 528/291; 528/295; 528/298; 528/300; 528/304; 528/308.6; 525/444
[58] Field of Search .............. 528/272, 274, 275, 288, 528/291, 295, 298, 300, 304, 308.6; 525/444

[56] References Cited

U.S. PATENT DOCUMENTS

| 3,959,230 | 5/1976 | Hays | 528/297 |
|---|---|---|---|
| 4,420,607 | 12/1983 | Morris et al. | 528/298 |
| 4,459,402 | 7/1984 | Morris et al. | 528/298 |
| 4,569,772 | 2/1986 | Ciallella | 252/8.6 |
| 4,702,857 | 10/1987 | Gosselink | 252/174.21 |
| 4,728,719 | 1/1988 | Morris et al. | 528/306 |
| 4,728,720 | 3/1988 | Morris et al. | 528/306 |
| 4,739,033 | 4/1988 | Morris et al. | 528/306 |
| 4,785,060 | 11/1988 | Nagler | 525/444 |

Primary Examiner—John Kight, III
Assistant Examiner—S. A. Acquah
Attorney, Agent, or Firm—Ronald A. Koatz

[57] ABSTRACT

The present invention pertains to polymeric whitening agents which contain both a fluorescent portion and a hydrophilic portion. These copolymers may be used on certain substrates, such as polyester or soiled cottons, for a greater brightening than previously known.

15 Claims, No Drawings

5,039,782

POLYMERIC WHITENING AGENT

BACKGROUND OF THE INVENTION

1. Field of the Invention

This invention relates to novel polymeric whitening agents which contain at least one fluorescent monomer component and one hydrophilic monomer component. The polymeric whitening agents may optionally contain a hydrophobic monomer component. The polymeric whitening agents may be used in fabric care compositions and provide enhanced fluorescence when used on hydrophilic and/or hydrophobic substrates.

2. Prior Art

Conventional fluorescent whitening agents (FWAs) for textiles have been used for many years as optical brighteners for fabric. These materials function by replacing the blue-violet component of visible light depleted by chromophore-containing soils in the form of blue fluorescence. This replacement reduces and/or eliminates the yellow tinge cast onto dingy fabrics by completing the full complement of visible light colors, leading to white light with a brightening effect.

FWAs currently used in detergent formulations are generally sulfonic acid salts of diaminostilbene derivatives such as those taught, for example, in U.S. Pat. No. 2,784,220 to Spiegler or U.S. Pat. No. 2,612,501 to Wilson. FWAs of this type have been long known to significantly "whiten" cotton. However, their brightening effect on less hydrophilic fabric, especially aged cotton, is substantially reduced. The most likely explanation for this phenomenon is that, while sulfonic acid salts of diaminostilbene fluorescent whitening agents are able to hydrogen bond to hydroxyls on the surface of cellulose via the sulfonate anion - hydroxyl proton hydrogen bonding interaction, this effect is reduced in polyester/cotton blends and is altogether absent in pure polyester. In the case of soiled cotton, oily soil residue can hydrophobically modify the surface of cellulose, deterring the deposition of hydrophilic FWAs.

It has been demonstrated that poly(ethylene terephthalate)/poly(oxyethylene terephthalate) copolymers adsorb onto hydrophobic surfaces to confer soil release properties. See U.S. Pat. No. 4,702,857 to Gosselink; U.S. Pat. No. 4,569,772 to Ciallela; and U.S. Pat. No. 3,959,230 to Hays. These materials are believed to function by hydrophilically modifying a hydrophobic surface (such as oily soil on fabric or polyester fabric itself), and thereby deterring deposition of hydrophobic soils. The poly(ethylene terephthalate) unit is believed to seek and adhere to the hydrophobic surface; the poly(ethylene glycol) portion is believed to give hydrophilic character to the fabric surface as well as aid the polymer in transfer through the aqueous medium. None of these references teach or suggest the use of a copolymer comprising a hydrophilic portion (capable of delivering the copolymer through an aqueous system) and a fluorescent portion (capable of simultaneously altering optical properties and serving as an anchoring group to provide substantivity for the hydrophobic agent).

U.S. Pat. No. 4,739,033 to Morris et al; U.S. Pat. No. 4,728,720 to Morris et al. and U.S. Pat. No. 4,720,719 to Morris et al. teach that 4,4'-stilbenedicarboxylic acid can be copolymerized with aliphatic diols to give materials with good mechanical properties and chemical resistance. U.S. Pat. No. 4,459,402 to Morris et al. and U.S. Pat. No. 4,420,607 to Morris et al. teach that 4,4'-stilbenedicarboxylic acid can be copolymerized with aliphatic diols and terephthalic acid for materials with improved flexural modulus. None of the copolymers contain a poly(ethylene glycol) monomeric portion. This monomeric portion allows the copolymer to be delivered from an aqueous medium (i.e., liquid and powder detergents, rinse cycle softeners, and dryer sheets).

Thus, there is a need in the art for copolymers which not only function as soil release agents (such as the poly(ethylene terephthalate)/poly(oxyethylene terephthalate) copolymers discussed above) but which also function as whitening agents for use in detergent compositions. Moreover, there is a need for the production of such polymers which can be delivered though an aqueous medium.

There is further a need in the art for polymers which enhance fluorescence when used to treat hydrophobic (e.g., soiled cotton, polyester, and/or blends of cotton and polyester) substrates.

Applicants have now discovered novel copolymers which have dual soil-release and whitening functions and which can be delivered through an aqueous medium such in heavy duty detergent compositions (liquid or powder), rinse cycle softeners or dryer sheets.

SUMMARY OF THE INVENTION

The subject invention provides novel polymeric whitening agents containing at least one fluorescent portion and at least one hydrophilic portion. The copolymers may optionally contain a hydrophobic monomer portion.

These novel copolymers may be used in fabric care compositions.

DETAILED DESCRIPTION OF INVENTION

This invention relates to novel copolymers which incorporate fluorescent and surface modifying functionalities. The copolymers are composed of at least two essential components and one optional monomer. These are (a) a fluorescent monomer, (b) a hydrophilic monomer, and (c) an optional hydrophobic monomer.

The novel copolymers of the invention may be used in fabric care compositions.

Compositions

Surface Active Agents

The fabric care compositions in which the novel copolymers of the invention may be used may contain an alkali metal or alkanolamine soap or a $C_{10}$–$C_{24}$ fatty acid or they may contain one or more surface active agents selected from the group consisting of anionic, nonionic, cationic, ampholytic and zwitterionic surfactants or, finally, they may contain mixtures of any of these.

Examples of anionic synthetic detergents are salts (including sodium, potassium, ammonium and substituted ammonium salts such as mono-, di- and triethanolamine salts) of $C_9$–$C_{20}$ alkylbenzenesulphonates, $C_8$–$C_{22}$ primary or secondary alkanesulphonates, $C_8$–$C_{24}$ olefinsulphonates, sulphonated polycarboxylic acids (prepared by sulphonation of the pyrolyzed product of alkaline earth metal citrates, e.g. as described in British Patent Specification No. 1,082,179), $C_8$–$C_{22}$ alkylsulphates, $C_8$–$C_{24}$ alkylpolyglycol -ether -sulphates, -carboxylates and -phosphates (containing up to 10 moles of ethylene oxide); further examples are described in "Surface Active Agents and Detergents" (Vol. I and II) by Schwartz, Perry and Berch.

Examples of nonionic synthetic detergents are the condensation products of ethylene oxide, propylene oxide and/or butylene oxide with $C_8$-$C_{18}$ alkylphenols. $C_8$-$C_{18}$ primary or secondary aliphatic alcohols, $C_8$-$C_{18}$ fatty acid amides; further examples of nonionics include tertiary amine oxides with one $C_8$-$C_{18}$ alkyl chain and two $C_{1-3}$ alkyl chains. The above reference also describes further examples of nonionics.

The average number of moles of ethylene oxide and/or propylene oxide present in the above nonionics varies from 1-30; mixtures of various nonionics, including mixtures of nonionics with a lower and a higher degree of alkoxylation, may also be used.

Further types of nonionic surfactants are those derived from etherification of an alkyl or an alkylaryl alcohol with a reducing sugar. Particularly suitable examples are the alkyl polyglycosides described in U.S. Pat. No. 4,713,447 to Letton et al. and DE 3,827,534 (assigned to Henkel). A further class of nonionics particularly useful for drier sheets are the distributing agents such as those described in U.S. Pat. No. 4,421,792 to Rudy et al., hereby incorporated by reference into the subject application.

Examples of cationic surfactants are the quaternary ammonium compounds such as the monoalkyltrimethyl and dialkyldimethylammonium halides or $C_1$-$C_3$ alkyl sulfates (i.e., methyl or ethyl sulfates), alkyl pyridinium salts and substituted immidazolinium species. Still other useful agents are the primary, secondary and tertiary amines and the condensation products of fatty acids with an alkyl polyamine (e.g., bis(amidoamine).

Examples of amphoteric or zwitterionic detergents are N-alkylamino acids, sulphobetaines, and condensation products of fatty acids with protein hydrolysates although, owing to their relatively high costs, they are usually used in combination with an anionic or a nonionic detergent.

Mixtures of the various types of active detergents may also be used, and preference is given to mixtures of an anionic and a nonionic detergent active. Soaps (in the form of their sodium, potassium and substituted ammonium salts) of fatty acids may also be used, preferably in conjunction with an anionic and/or a nonionic synthetic detergent.

Optional Ingredients

The compositions in which the polymer may be added may also contain other ingredients such as detergent enzymes (e.g., lipases, proteases, cellulases, oxidases, amylases and the like), builders (phosphates, zeolites, citrates and the like), enzyme stabilizers (e.g., propionate, formic acid, low levels of calcium, polyols and boron-containing components), alkalinity buffers (organic amines, sodium carbonate, silicates and the like), hydrotropes, additional softening and antistatic agents (i.e., clays, silicones, ethoxylated amines), other soil release polymers and antiredeposition agents and other ingredients including other types of fluorescent whitening agents such as are known in the art (e.g., various Tinopal agents such as Tinopal UNPA, Tinopal CBS-X etc.).

While the invention above has been mainly described in terms of HDLs and powder detergents which are usable in dilution, it should be emphasized that the novel copolymers may also be used in other fabric care compositions such as dryer sheet compositions (U.S. Pat. No. 4,421,792 to Rudy et al.) or fabric liquid compositions (U.S. Pat. No. 4,661,269 to Trinh et al.).

Copolymers

The copolymers of the invention subject may be defined by the following formula I:

$$-(A)_n-(B)_m-(C)_p- \quad (I)$$

wherein A is a fluorescent monomer and is a planar, highly conjugated aromatic moiety bearing the appropriate bifunctionality for incorporation into the main chain of the polymer; Examples of such bifunctional groups include:

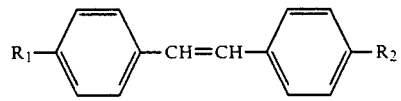

wherein (1) $R_1=R_2=CO_2R$ (wherein the two R groups may be the same or different but are as defined below); (2) $R_1$ may be the same or different than $R_2$ and equals OH or an alcohol having 1-4 carbons (e.g. methanol, ethanol); or (3) $R_1=CO_2R$ and $R_2=OH$ or an alcohol having 1-4 carbons; and wherein the R group attached to the carboxylic acid group is an alkyl group having 1 to 10 carbons, preferably 1-5 carbons, most preferably 1-2 carbons or an aryl group such that there are more than 2 aromatic rings on the monomer;

B is a hydrophilic monomer incorporated to confer hydrophilicity to hydrophobic surfaces;

C is a hydrophobic monomer incorporated to adjust the water solubility and binding strength to hydrophobic surfaces;

n is at least 1 and may range from 1 to 500;

m is at least 5 and may range from 5 to 500; and p may be zero and may range from 0 to 500.

The level of m is chosen to balance the water dispersability, substantivity and hydrophilic character of the deposited coating. In practice, a minimum value for m of approximately 5 is useful.

The monomer A may comprise 1-50 mol % of the composition, the hydrophilic monomer B may comprise 5-45 mol % of the composition and the hydrophobic monomer C, if present, may comprise 1-49 mol % of the composition.

Although A, B, and C are expressed above as a copolymer, it is to be understood that the places of A, B and C may be interchanged.

The block copolymers of the invention may be further defined by the following formula II:

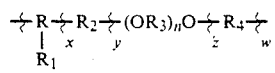

wherein:

R is a difunctional aryl or alkyl group such as, for example, difunctional benzene or naphthalene, preferably difunctional benzene or a difunctional straight or branched alkyl chain containing 4 to 16 carbon atoms;

$R_1$ is hydrogen or an aliphatic containing group having 1-20 carbons, preferably a straight-chained alkyl group having 1-12 carbons, most preferably 1 to 5 carbons, an aryl, an alkaryl, a secondary amine such as, for example, dialkylamine, an alkali metal sulfonate, an alkali metal carboxylate, an alkyl ether or a halogen atom;

$R_2$ is a straight or branch chain alkoxy group having 1 to 16 carbons, preferably 1 to 4 carbons, or an aryloxy or a substituted aryloxy group;

$R_3$ is a straight or branch chain alkyl group having 1 to 16 carbons, preferably a 1-3 carbons; and $R_4$ is a difunctional fluorescent moiety;

x, which represents the number of monomeric units of the optional hydrophobic group, is selected such that the hydrophobe is present at 0-49 mol % of the composition mixture when the copolymer is polymerized;

y is selected such that the $R_2$ group is present at 0-45 mol % of the mixture;

z is selected such that the $(OR_3)_n$ group is present at 5-45 mol % of the mixture wherein n is an integer between 2 and preferably 10 to 25; and w is selected such that the $R_4$ is present at 1-50 mol % of the reaction mixture.

As discussed above, the fluorescent monomer (represented above by $R_4$) is a planar, highly conjugated aromatic moiety bearing the appropriate bifunctionality for incorporation into the main chain of the polymer. Preferably, the fluorescent monomer should absorb UV light (260-400 nm) and emit in the blue visible range (400-490 nm). Preferred monomers are the stilbene derivatives such as bis(carbomethoxy) stilbene, bis(hydroxy) stilbene, bis(amino) stilbene, and mixtures of the above. Examples of difunctional stilbenes which may be used in the present invention include 4,4'-bis (carbomethoxystilbene), 4,4'-bis(hydroxystilbene), 4,4'-bis-(aminostilbene) and 1,4'-bis(2(-4'-carbomethoxy styrenyl)) benzene. Still other examples of fluorescers which can suitably be difunctionalized by those skilled in the art may be found in H. Hefti, "Fluorescent Whitening Agents", R. Anliker and G. Muller, Eds, George Thieme Publishers, Stuttgart, 1975.

Particularly preferred fluorescent monomers are those like 4,4'-bis(carbomethoxystilbene) which is white in color and straight forward to prepare. As discussed above, the conjugated aromatic moiety may be added as 1-50 mol % of the reaction mixture, preferably 30-50 mol %. In formula II above, w may range from about 1-500.

It should be understood that the fluorescent monomer (represented $R_4$) may comprise a difunctional group which is a highly conjugated aromatic ring system having more than 2 aromatic rings. An example of such a difunctional compound is 1,4'-bis(2(-4'-carbomethoxy styrenyl) benzene wherein $R_4$ may be represented in formula II above as follows:

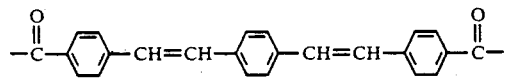

The hydrophilic component (represented by $R_2$ and $(OR_3)_n$) is incorporated to confer hydrophilicity to naturally hydrophobic surfaces such as soiled cotton or polyester as well as to facilitate transfer of the polymer through an aqueous medium. Hydrophilic monomers which may be used include, but are not limited to the $\alpha,\omega$-diols or alkylene glycols such as ethylene glycol, propylene glycol, butylene glycol, and mixtures of the three. Other hydrophilic monomers which may be used as $R_2$ are based on simple sugars or poly(saccharides), or $\alpha,\omega$poly(ols) which may include glucose, sucrose, sorbitol or glycerol.

In a preferred embodiment of the invention, $R_2$ is an ethylene glycol and $(OR_3)_n$ is a poly(ethylene glycol). Suitable polyethylene glycols are those manufactured by Union Carbide and sold under the CARBOWAX® tradename. Examples include CARBOWAX® 300, 600, 1000, 3350 and the like. It is not absolutely required that the ethylene glycol monomeric unit be present as part of the final copolymer although generally the molecule is present as 5-30 mol %, preferably 10-20% mol % of the reaction mixture.

The poly(ethylene glycol), however, must be present in at least sufficient quantity to ensure that the final copolymer may be delivered through an aqueous medium. In general, this monomer is present as 5-45 mol %, preferably 30-45% of the reaction mixture.

In general, applicants have found that the reaction works favorably when the poly(ethylene glycol) is mixed with the ethylene glycol in a molar ratio of about 3:1. There is no criticality to this ratio, however, and the copolymer will form within any of the broad ranges described above.

The hydrophobic monomer which may be optionally incorporated is used to adjust the water solubility and binding strength of the copolymer to hydrophobic surfaces. Suitable hydrophobic monomers which may be used include long chain aliphatic $\alpha$, $\omega$-diols, $\alpha,\omega$-diamines, or $\alpha$, $\omega$-dicarboxylates. Another suitable class of hydrophobic monomers includes the aromatic 4,4'-phenylenediols, 4,4'-biphenols, or 4,4'-dihydroxydiphenyl ethers, as well as the analogous dicarboxy or diamino species. Especially preferred monomers are terephthalic acid and hexanedioic acid.

These monomers are generally added as 0-49 mol % of the reaction mixture, preferably 10-25 mol %.

In one especially preferred embodiment of the invention, the fluorescent monomer is 4,4'-bis(carbomethoxystilbene), the hydrophilic monomer is a mixture of poly(ethylene glycol) and ethylene glycol and the hydrophobic monomer is terephthalic acid.

The molecular weight of the copolymers may range from 3000 to 100,000, preferably 3000 to 50,000, and most preferably 3000 to about 25,000. The ratio of monomers can vary broadly depending upon the end use requirements such as whether the polymer is being used for soil release, antiredeposition, or enzyme stabilization.

However, as is usual for soil release agents, some balance is generally sought between hydrophilic and hydrophobic properties. These can be fine tuned by those skilled in the art.

As mentioned above, in one embodiment of the invention, the copolymers of the present invention may be based upon the condensation product of dimethyl terephthalate, ethylene glycol, poly(ethylene glycol), and 4,4'- bis (carbomethoxystilbene).

The polyethylene glycol used will generally have a molecular weight ranging from about 200 to about 3000.

These components may be combined via a 1-step transesterification reaction as set forth below:

POLYMERIZATION SCHEME

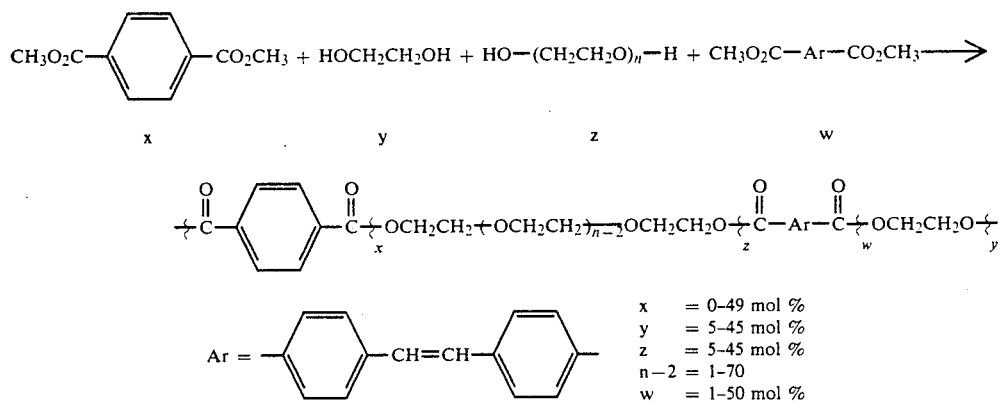

```
x   = 0-49 mol %
y   = 5-45 mol %
z   = 5-45 mol %
n-2 = 1-70
w   = 1-50 mol %
```

According to the above scheme, the hydrophobic poly(ethylene terephthalate) unit has been incorporated to adhere the polymer to hydrophobic surfaces such as oily soil residue on cotton fabric or polyester-based fabric. The hydrophilic poly(ethylene glycol) unit has been incorporated to facilitate polymer transfer through an aqueous medium and to modify a hydrophobic surface to a more hydrophilic state, thereby deterring oily soil build-up. The 4,4'-bis (carbomethoxystilbene) unit has been incorporated to provide optical brightening in the form of blue fluorescence. The 4,4'-bis (carbomethoxystilbene) was synthesized via Wittig reaction between (4-carbomethoxy) benzyltriphenylphosphonium bromide and methyl 4- formylbenzoate using sodium methoxide base in the presence of methanol/toluene solvent and affords a cis/trans mixture of isomers.

Yields ranged typically from 65-90%. Pure isomeric forms of 4,4'-bis (carbomethoxystilbene) could be obtained by washing the mixture several times with 2:1 methanol/toluene solution, which selectively dissolves the cis isomer and leaves the trans form insoluble. 4,4'-bis(carbomethoxystilbene) can be used as an isomeric mixture or as a pure isomeric form. Polymers were obtained by charging the reaction vessel with 1 eq. of the diester species, a slight excess of the diol species, and suitable catalysts such as $Ca(OAc)_2$. The contents of the reaction vessel were heated between 180°-250° C. for between 5-24 hours. The resulting materials ranged in molecular weight from 3000-75,000 and exhibited fluorescence in the presence of long wave UV light.

The following examples are intended to further illustrate the invention and are not intended to be limiting in any way.

EXAMPLE 1

Synthesis and Characterization of Fluorescent Monomer (4,4'-bis(carbomethoxystilbene)

4,4'-Bis (carbomethoxystilbene): To a 1 L 3-neck round bottom flask fitted with a glass stopper, rubber septum, and reflux condenser fitted with a nitrogen inlet tube, was added 20.0 g (39.77 mmol) (4-carbomethoxy) benzyltriphenylphosphonium bromide; 7.83 g (47.73 mmol) methyl 4-formylbenzoate; and 110 mL 2:1 methanol: toluene. After the starting material dissolved, 10.0 mL (43.75 mmol) 25% sodium methoxide solution in methanol was added dropwise over several minutes. The reaction vessel was heated at reflux for 30 minutes. After cooling to room temperature, the reaction vessel was cooled at 0° C. for several hours. the resulting precipitate was filtered, washed with 2:1 methanol: toluene, and dried in a vacuum oven to afford 5.54 g (72%) of the compound as a 57:43 mixture of cis: trans isomers.

Cis isomer mp. = 109°-111° C. (lit.[8] 109°-111° C.); $^1H$ NMR($CDCl_3$, 200 MHz)δ3.90 (s, 6H), 6.72 (s, 2H), 7.27 (d, J=8.3 Hz, 4H), 7.90 (d,J=8.3 Hz, 4H). cl Trans isomer mp.-32 228°-230° C. (lit.[8] 227°-228° C.); $^1H$ NMR ($CDCl_3$, 200 MHz)δ3.94 (s, 6H), 7.27 (s, 2H), 7.60 (d,J=8.4 Hz, 4H), 8.05 (d,J=8.4 Hz, 4H).

8. B. H. Lee and C. S. Marvel, *J. Polym. Sci., Polym. Chem. Ed.*, 20, 393 (1982).

The reaction scheme is set forth below:

Scheme 1

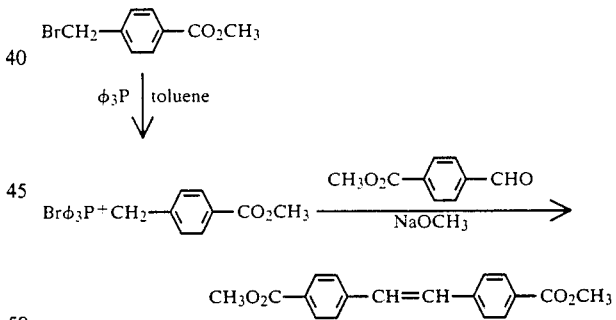

EXAMPLE 2

General Procedure for Low (3000) Molecular Weight Fluorescent Surface-Modifying polymers To a 250 mL 3-neck round bottom flask fitted with an overhead stirrer, distillation condenser, and nitrogen inlet tube was added 19.41 g (0.01 mol) dimethyl terephthalate, 9.46 g (0.153 mol) ethylene glycol, 54.01 g (0.090 mol) poly (ethylene glycol) MW=600, 7.40 g (0.025 mol) 4,4'-bis (carbomethoxystilbene), 0.135 g (0.876 mmol) Ca $(OAc)_2$, 0.135 g (0.463 mmol) $Sb_2O_3$, and 0.135 g (0.613 mmol) 2,6-di-tert butyl-4-methylphenol. The reaction vessel was heated at 175° C. for 2 h. The temperature was raised to 150° C., at which point MeOH began to distill off, and was heated at that temperature for 5 h. The temperature was further raised to 220° C. and heated at that temperature for an additional 19 h. The reaction mixture was allowed to cool to room temperature under nitrogen.

$^1$H NMR (CDCl$_3$, 300 MHz),δ3.68 (broad s,(—CH$_2$CH$_2$O)$_x$—), 3.85(t,J=4.7 Hz, —CO$_2$CH$_2$C-H$_2$O—(CH$_2$CH$_2$O)$_x$—), 3.99 (t,J=4.7 Hz, HOCH$_2$C-H$_2$O$_2$C—C$_6$H$_4$—CO—), 4.49 (t,J=4.7 Hz, HOCH$_2$C-H$_2$O$_2$C—C$_6$H$_4$—CO—), 4.50 (t,J=4.7 Hz, —CO$_2$CH$_2$CH$_2$O—(CH$_2$CH$_2$O)$_x$—), 4.71 (s, —CO$_2$CH$_2$CH$_2$O$_2$C—), 6.72 (s, —COC$_6$H$_4$CH=CHC$_6$H$_4$CO— cis), 7.24 (s, —COC$_6$H$_4$CH=CHC$_6$H$_4$CO— trans), 7.28 (d,J=8.3 Hz —COC$_6$H$_4$CH=CHC$_6$H$_4$CO— cis), 7.60 (d,J=8.3 Hz —COC$_6$H$_4$CH=CHC$_6$H$_4$CO— trans), 7.91 (d,J=8.3 Hz —COC$_6$H$_4$CH=CHC$_6$H$_4$CO— cis), 8.06 (d,J=8.3 Hz —COC$_6$H$_4$CH=CHC$_6$H$_4$CO— trans), 8.12 (s, —COC$_6$H$_4$CO—).

EXAMPLE 3

General Procedure for High (50,000–75,000) Molecular Weight Fluorescent Surface-Modifying Polymers To a 250 mL 3-neck round bottom flask fitted with an overhead stirrer, distillation condenser, and nitrogen inlet tube was added 19.41 g (0.01 mol) dimethyl terephthalate, 9.46 g (0.153 mol) ethylene glycol, 54.01 g (0.090 mol) poly(ethylene glycol) MW =600, 7.40 g (0.025 mol) 4.4'-bis(carbomethoxystilbene), 0.135 g (0.876 mmol) Ca(AOc)$_2$, 0.135 g (0.463 mmol) Sb$_2$O$_3$, and 0.135 g (0.613 mmol) 2,6-di-tert-butyl-4-methylphenol. The reaction vessel was heated at 175° C. for 2 h. The temperature was raised to 205° C., at which point MeOH began to distill off, and was heated at that temperature for 5 h. The temperature was further raised to 220° C. and heated at that temperature for an additional 19 h. After this period, the reaction vessel was placed under vacuum (15–20 torr) and kept at 220° C. for 5 h. The reaction mixture was allowed to cool to room temperature under nitrogen.

$^1$H NMR (CDCl$_3$, 300 MHz),δ3.68 (broad s, (—CH$_2$CH$_2$O)$_x$—), 3.85 (t,J=4.7 Hz, —CO$_2$CH$_2$C-H$_2$O—(CH$_2$CH$_2$O)$_x$—), 4.50 (t,J=4.7 Hz, —CO$_2$CH$_2$CH$_2$O— (CH$_2$CH$_2$O)$_x$—), 4.71 (s, —CO$_2$CH$_2$CH$_2$O$_2$C—), 6.72 (s, —COC$_6$H$_4$CH=CHC$_6$H$_4$CO— cis), 7.24 (s, —COC$_6$H$_4$CH=CHC$_6$H$_4$CO— trans), 7.28 (d,J=8.3 Hz —COC$_6$H$_4$CH=CHC$_6$H$_4$CO— cis), 7.60 (d,J=8.3 Hz —COC$_6$H$_4$CH=CHC$_6$H$_4$CO— trans) 7.91 (d,J=8.3 Hz —COC$_6$H$_4$CH=CHC$_6$H$_4$CO— cis), 8.06 (d,J=8.3 Hz —COC$_6$H$_4$CH=CHC$_6$H$_4$CO— trans), 8.12 (s, —COC$_6$H$_4$CO—).

It should be added that, although the current examples refer to polyester, suitable polyamides may be employed and are also contemplated to fall within the scope of the current invention.

EXAMPLE 4

Polymers Prepared and Their UV Absorbance

A series of polymers were synthesized according to the procedures describe in the EXPERIMENTAL section and described in Table 1. The polymers were characterized by UV spectroscopy and gel permeation chromatography (GC). Molar extinction (ε) was calculated based upon Beer's Law equation ε=A/cl, where A=absorbance as measured by the UV spectrophotometer, l=path length, and c=the molar concentration. In the case of these polymers, molarity was based upon the molecular weight of the average repeating unit. The results are presented below in Table 1:

TABLE 1

| | DMT | CMS | EG | PEG | MW |
|---|---|---|---|---|---|
| Polymer | | | | | |
| A | 0.495 | 0.005 | 0.13–0.15 | 0.35–0.37 | 3,000 |
| B | 0.450 | 0.050 | 0.13–0.15 | 0.35–0.37 | 52,000 |
| C | 0.400 | 0.100 | 0.13–0.15 | 0.35–0.37 | 19,800 |
| D | 0.325 | 0.175 | 0.13–0.15 | 0.35–0.37 | 46,000 |
| E | 0.25 | 0.250 | 0.13–0.15 | 0.35–0.37 | 5,200 |
| F | 0.125 | 0.375 | 0.13–0.15 | 0.35–0.37 | 11,600 |
| Comparative Polymer | | | | | |
| | 0.50 | 0.00 | 0.13–0.15 | 0.35–0.37 | 23,000 |

DMT = dimethylterephthalate
CMS = 4,4'-bis(carbomethoxystilbene)
EG = ethylene glycol
PEG = poly(ethylene glycol), molecular weight 600
MW = molecular weight The comparative polymer is a polyethylene terephthalate/polyoxyethylene terephthalate polymer (PET-POET)

TABLE 2

| | λ Max | E Max | ε (1/mol-cm) | I |
|---|---|---|---|---|
| Polymer | | | | |
| A | 335 nm | 384 nm | 174 | 8.4 |
| B | 335 nm | 384 nm | 1,750 | 38.3 |
| C | 335 nm | 384 nm | 3,130 | 70.7 |
| D | 335 nm | 384 nm | 4,480 | 84.1 |
| E | 335 nm | 384 nm | 5,900 | 99.1 |
| F | 335 nm | 384 nm | 10,300 | 135.5 |
| Comparative Polymer | | | | |
| | 298 nm | — | — | 1 |

ε = Molar extinction coefficient
λ Max = Wavelength of Maximum Absorbance
E Max = Wavelength of Maximum Fluorescence Emission
I = Fluorescence Intensity. Relative to Poly(ethylene terephthalate)/poly(oxyethylene terephthalate) standard.

As can be seen from Table 2, the fluorescence intensity of the copolymer of the invention is significantly higher than the comparative which is used as a standard. Since the actual value of I for the comparative polymer was 4.6, each of the recorded values of I for polymers A–F was divided by 4.6 to obtain the values listed in Table 2.

EXPERIMENTAL

UV absorbance spectra were obtained on a Beckman DU-65 spectrophotometer. Chloroform was used as the sample and reference solvent. Fluorescence spectra were obtained on a Perkin-Elmer MPF-66 Fluorescence Spectrophotometer at a concentration of 0.0011 g fluorescent polymer/liter and are un-corrected. Chloroform was used as the sample solvent. Fluorescence emission data were obtained by radiating the samples at λ max (335 nm) and scanned from 350–500 nm at 120 nm/min. Emission and exitation slit widths =2.0 nm.

EXAMPLE 5

Brightness Evaluation

Brightness was measured by the following method:
Fifteen panelists were enlisted to judge the relative brightness of polyester and cotton test clothes which were dosed either with Tinopal UNPA or our fluorescent polymer, or left virgin. The experiments were run in the presence or absence of surfactant. All brightness assessment was done in our light room under long wave ultraviolet light. The general procedure for cloth preparation is as follows:

All test cloths were washed three times with a detergent composition (Example 6) w/o fluorescer to remove incidental residues. 2 g of the composition formulation w/o fluorescer and the appropriate amount of fluorescent polymer (the molar concentration—based upon amount of fluorescent moiety—of a typical commercial liquid detergent w/fluorescer) were run in a terg-o-tometer wash at 40° C., at 120 ppm Ca/Mg 2:1, and for 14 min. The cloths were then rinsed with tap water and dried in a conventional clothes drier for 10–15 minutes.

Evaluation

The results with a 51,000 MW polymer containing 5 mol % fluorescer are shown below in Table 3 below:

TABLE 3

| Cloth Containing | NUMBER OF PANELISTS WHO SELECTED BRIGHTEST CLOTH | | | |
|---|---|---|---|---|
| | Polyester w/ surfactant | Polyester w/o surfactant | Cotton w/ surfactant | Cotton w/o surfactant |
| Fluorescent Polymer | 14 | 13 | 0 | 0 |
| Tinopal UNPA | 1 | 2 | 15 | 15 |
| Virgin Cloth | 0 | 0 | 0 | 0 |

It is clear from these results that all panelists could detect a brightening effect with the fluorescent polymer of the invention, relative to an untreated cloth. Moreover, the overwhelming majority of panelists believed that polyester test cloths washed with the polymer of the present invention were brighter than those washed with Tinopal, with or without surfactant. Tinopal, on the other hand, is more effective in brightening cotton. This example demonstrates that the polymers of the instant invention are capable of depositing from a detergent composition onto hydrophobic fabric.

EXAMPLES 6–10

Use of copolymers of the invention in Heavy Duty Liquid (HDL) Compositions.

| Ingredient | wt. % | | | | |
|---|---|---|---|---|---|
| | 6 | 7 | 8 | 9 | 10 |
| Sodium C11-C15 Alkyl Benzene Sulfonate | 10.0 | 17.0 | 26.0 | 15.0 | 11.6 |
| Sodium Alkyl Ethoxy Sulfate (2) | 6.0 | — | — | — | 8.2 |
| Alcohol Ethoxylate (1) | 8.0 | 7.0 | 12.0 | 5.0 | 4.2 |
| Sodium Citrate | 7.0 | 7.0 | 10.0 | — | 5.0 |
| Sodium Salt of C12-C18 Fatty Acid | — | — | — | — | 3.6 |
| Sodium tartrate mono and disuccinate | — | — | — | — | 3.1 |
| Monoethanolamine | 2.0 | 2.0 | 2.0 | — | — |
| Triethanolamine | 2.0 | 2.0 | 2.0 | — | — |
| Sodium Silicate | — | — | — | 2.5 | — |
| Savinase | 0.75 | — | 0.75 | — | 0.4 |
| Sodium Borate | 3.5 | — | 3.5 | — | — |
| Sodium Formate | — | — | — | — | 1.2 |
| Glycerol | — | — | 5.0 | — | — |
| Propylene Glycol | 4.0 | — | — | — | 4.5 |
| Sodium Xylene Sulfonate | 3.0 | 3.0 | — | 1.0 | 2.3 |
| Ethanol | — | — | — | — | 1.0 |
| Tinopal UNPA | 0.25 | 0.25 | 0.2 | 0.1 | 0.2 |
| FW Polyester | 0.05 to 1.0 | | | | |
| Water | to 100.0 | | | | |

(1) C12 to C15 alcohol condensed with 9 mole ethylene oxide
(2) C12 to C15 alcohol condensed with 3 mole ethylene oxide and sulfated

EXAMPLES 11–15

Use of copolymers of the Invention in Powdered Detergent Compositions.

| Ingredient | wt. % | | | | |
|---|---|---|---|---|---|
| | 11 | 12 | 13 | 14 | 15 |
| Sodium C11-C12 Alkyl Benzene Sulfonate | 11.0 | 11.5 | 17.0 | 11.0 | 15.0 |
| Sodium C12-C15 Alkyl Ethoxy Sulfate (2) | — | 5.5 | — | — | — |
| Sodium C12-C15 Alkyl Sulfate | 10.0 | — | — | 9.0 | 5.0 |
| Alcohol Ethoxylate (1) | — | 3.0 | — | 2.0 | 3.0 |
| Sodium Salt of C12-C18 Fatty Acid | 1.0 | — | — | — | 1.0 |
| Sodium Tripolyphosphate | — | — | — | — | 25.0 |
| Sodium Aluminosilicate | 25.0 | 15.0 | 20.0 | 10.0 | — |
| Sodium Silicate | 3.0 | 20.0 | 5.0 | 15.0 | 15.0 |
| Sodium Carbonate | 18.0 | 18.0 | 15.0 | 30.0 | 20.0 |
| Savinase | 0.5 | 0.5 | 0.5 | 0.5 | 1.0 |
| Tinopal AMS | 0.15 | 0.2 | 0.25 | 0.15 | 0.15 |
| FW Polyester | 0.05 to 1.0 | | | | |
| Sodium Sulfate | to 100.0 | | | | |

(1) & (2) same as HDL compositions

EXAMPLES 16–18

Use of copolymers of the invention in Fabric Softener Compositions.

| Ingredient | Wt. % | | |
|---|---|---|---|
| | 16 | 17 | 18 |
| Dimethyldialkyl ammonium chloride | 3.2 | 6.5 | 6.25 |
| Trimethylalkyl ammonium chloride | 0.6 | 0.9 | — |
| Alkyl amidoethyl alkyl imidazoline | 3.3 | 16.0 | — |
| Polydimethyl siloxane | 0.1 | 0.5 | — |
| Ethanol | 0.7 | 1.4 | — |
| Calcium chloride | 0.1 | 0.3 | 0.1 |
| FW Polyester | 0.05 to 1.0 | | |
| Water | to 100.0 | | |

We claim:

1. A copolymer whitening agent containing a fluorescent group and a hydrophilic group.

2. A copolymer according to claim 1 wherein the block copolymer has the formula $$-(A)_n-(B)_m-(C)_p- \quad (I)$$

wherein A is a fluorescent monomer and is a planar, highly conjugated aromatic moiety bearing the appropriate bifunctionality for incorporation into the main chain of the polymer;

B is a hydrophilic monomer;

C is a hydrophobic monomer;

n ranges from 1 to 500;

m ranges from 5 to 500; and p ranges from 0 to 500.

3. A copolymer according to claim 1, having the formula

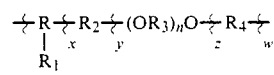

wherein:

R is a difunctional aryl group or a difunctional straight or branched alkyl chain having 4 to 16 carbons;

$R_1$ is hydrogen, an aliphatic group having 1 to 20 carbons, an aryl, an alkaryl, a secondary amine, an alkali metal sulfonate, an alkali metal carboxylate, an alkyl ether or a halogen atom;

$R_2$ is a straight or branch chain alkoxy group having 1 to 16 carbons, an aryl or a substituted aryl group;

$R_3$ is a straight or branch chain alkyl group having 1 to 16 carbons; and $R_4$ is a difunctional fluorescent moiety;

x is selected such that the difunctional hypophobic group is present at 0–49 mol % of the composition mixture when the copolymer is polymerized;

y is selected such that the $R_2$ group is present as 0–45 mol % of the mixture;

z is selected such that the $(OR_3)_n$ group is added as 5–45 mol % of the mixture wherein n is an integer between 1 an 200; and w is selected such that the $R_4$ group is present as 1–50 mol % of the reaction mixture.

4. A copolymer according to claim 3, wherein R is difunctional benzene or napthalene.

5. A copolymer according to claim 3, wherein $R_1$ is hydrogen or a straight chain alkyl group having 1 to 12 carbon atoms.

6. A copolymer according to claim 3, wherein $R_2$ is an alkoxy group having 1 to 4 carbons.

7. A copolymer according to claim 3 wherein

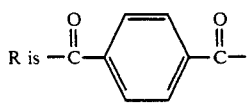

and $R_1$ is Hydrogen

8. A copolymer according to claim 3 wherein $R_2$ is $-OCH_2CH_2-$.

9. A copolymer according to claim 3 wherein $R_3$ is $-CH_2CH_2-$.

10. A copolymer according to claim 3 wherein $R_4$ is

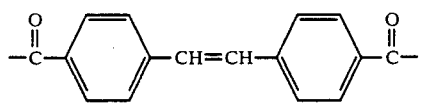

11. A copolymer according to claim 3, wherein $R_4$ is

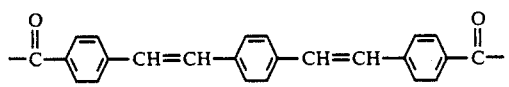

12. A copolymer according to claim 3 wherein

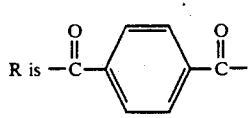

and $R_1$ is H;
$R_2 = -OCH_2CH_2-$;
$R_3 = -CH_2CH_2-$; and

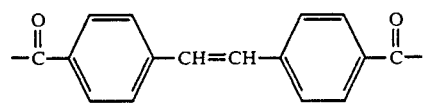

13. A copolymer according to claim 3 wherein

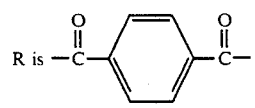

and $R_1$ is H;
$R_2 = -OCH_2CH_2-$;
$R_3 = -CH_2CH_2-$; and $R_4 =$

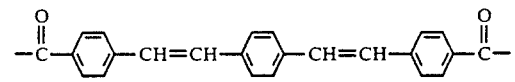

14. A copolymer according to claim 3 prepared by polymerizing a mixture of dimethyl terephthalate, ethylene glycol, polyethylene glycol of MW 200–3000 and 4,4'-bis(carbomethyoxystilbene).

15. A copolymer according to claim 3 prepared bypolymerizing a mixture of dimethyl terephthalate, ethylene glycol, polyethylene glycol of MW 200–3000 and 1,4-bis(2(-4'carbomethyoxystyrenyl) benzene.

* * * * *